United States Patent
Chevalier et al.

(10) Patent No.: US 6,348,083 B1
(45) Date of Patent: Feb. 19, 2002

(54) PROCESS AND INSTALLATION FOR THE RECOVERY AND/OR PURIFICATION OF THE NITROUS OXIDE CONTAINED IN A WASTE GAS

(75) Inventors: Gilbert Chevalier, Voisins le Bretonneux (FR); Philippe Urner, Ecublenz (CH)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/505,997

(22) Filed: Feb. 17, 2000

(30) Foreign Application Priority Data

Feb. 17, 1999 (FR) .............................. 99 01908

(51) Int. Cl.[7] .............................................. B01D 59/12
(52) U.S. Cl. .............................................. 95/47; 96/10
(58) Field of Search .................... 95/45, 47, 258; 96/4, 8, 10; 55/338; 210/750, 188; 423/400

(56) References Cited

U.S. PATENT DOCUMENTS

| | | | |
|---|---|---|---|
| 4,203,959 A | * 5/1980 | Munster | 423/400 |
| 4,230,463 A | 10/1980 | Henis et al. | 55/16 |
| 5,478,549 A | 12/1995 | Koch | 423/403 |
| 5,520,169 A | * 5/1996 | Georgieff et al. | 128/204.16 |
| 5,690,968 A | * 11/1997 | Ross et al. | 424/718 |
| 5,849,257 A | * 12/1998 | Fujiwara et al. | 423/404 |

FOREIGN PATENT DOCUMENTS

| | | |
|---|---|---|
| EP | 0 806 215 | 11/1997 |
| EP | 1030127 A1 * | 8/2000 |
| JP | 54061096 A * | 5/1979 |

* cited by examiner

Primary Examiner—David A. Simmons
Assistant Examiner—Frank M. Lawrence
(74) Attorney, Agent, or Firm—Young & Thompson

(57) ABSTRACT

An installation and a process for the recovery and/or purification of at least one portion of the nitrous oxide ($N_2O$) contained in a flow of waste gas containing nitrous oxide and at least one other gaseous compound, in which: (a) at least one nitrous oxide portion contained in the flow of waste gas is separated by permeation, and (b) at least a portion of the gaseous nitrous oxide separated in step (a) is recovered. Preferably, the source of the flow of waste gas is an industrial unit using an industrial process giving off the waste gas, preferably a unit for the production of adipic acid, a unit for the production of nitrous oxide, a unit for the production of glycoxylic acid or a unit for the production of nitric acid.

12 Claims, 2 Drawing Sheets

PROCESS AND INSTALLATION FOR THE RECOVERY AND/OR PURIFICATION OF THE NITROUS OXIDE CONTAINED IN A WASTE GAS

FIELD OF THE INVENTION

The present invention relates to a process and an installation for the recovery and/or purification of the nitrous oxide ($N_2O$) contained in a flow of waste gas, particularly a flow of gas given off by an industrial unit producing adipic acid, nitric acid, glycoxylic acid, nitrous oxide or phenol.

BACKGROUND OF THE INVENTION

At present, so as to preserve the environment, numerous efforts have been made by industries to put in place systems for treatment of waste, particularly waste gases, such as combustion fumes, which previously were often discharged to the atmosphere without preliminary treatment.

Thus, nitrous oxide is a compound which, in gaseous form, is considered as potentially active in the phenomenon of destruction of the stratospheric ozone layer, given that the latter has a great tendency to decompose to $NO_x$ under the influence of natural ultraviolet radiation.

Moreover, nitrous oxide takes part in the greenhouse effect in a manner similar to other regulated gases such as carbon dioxide ($CO_2$) or the fluorocarbonated compounds, such as CFC.

Nitrous oxide is conventionally found in waste gases or off gases discharged to the atmosphere by certain industrial units, such as units for the production of adipic acid or units for the production, purification and storage of nitrous oxide.

As therefore necessary, in order to preserve the environment, to control the quantity of nitrous oxide discharged by this type of industrial unit.

The problem is therefore to be able to recover and, if possible, to recycle or economically use, in an effective manner, the nitrous oxide contained in a waste gas or an off gas and this even if the proportion of nitrous oxide in the waste gas is high, for example more than 20%, even more than 50%.

SUMMARY OF THE INVENTION

The present invention therefore relates to a process for the recovery and/or purification of at least a portion of the nitrous oxide ($N_2O$) contained in a flow of waste gas containing nitrous oxide and at least one other gaseous compound, in which:

(a) at least one nitrous oxide portion contained in the flow of waste gas is separated by permeation, and (b) at least one portion of the gaseous nitrous oxide separated in step (a) is recovered.

Within the scope of the invention, there is meant by "waste gas", a gas or a gaseous mixture containing nitrous oxide conventionally discharged to the atmosphere with or without preliminary treatment.

As the case may be, the process of the invention can comprise one or several of the following characteristics:

- the flow of waste gas to be separated contains from 5 to 99.96 of nitrous oxide, preferably 20 to 99.9% by volume of nitrous oxide, more preferably 50 to 99.9% of nitrous oxide, by volume;
- the flow of waste gas to be separated contains, in addition, at least one gaseous compound selected from the group consisting of nitrogen, oxygen, carbon monoxide and gaseous compounds having a speed of permeation different from that of $N_2O$;
- the permeation is carried out by passage of the flow of waste gas to be separated through at least one permeation module, preferably at least one module with membrane fibers;
- the permeation is carried out by passage of the flow of waste gas to be separated through several permeation modules, preferably with membrane fibers and/or arranged in cascade;
- in step (b), a gas is recovered containing 80% to 100% of nitrous oxide, preferably at least 90% of nitrous oxide, more preferably at least 95% of nitrous oxide;
- the flow of waste gas to be separated is an off gas from an industrial process, preferably an off gas from a process for the production of adipic acid, a process for the production of nitrous oxide, a process for the production of phenol, a process for the production of nitric acid or a process for the production of glycoxylic acid;
- the waste gas to be separated is at a temperature comprised between $-30°$ C. and $+80°$ C., preferably $-20°$ C. to $+60°$ C.;
- the waste gas is at a pressure of $10^5$ Pa to $10^7$ Pa, preferably $10^6$ Pa to $6.10^6$ Pa;
- in step (b), a gas containing principally nitrous oxide is recovered at the permeate outlet of at least one permeation module;
- in step (b), a gas containing principally nitrous oxide is recovered at the retentate outlet of at least one module.

The invention also relates to an industrial installation adapted to use the process of the invention, which industrial installation permits the recovery and/or purification of at least one portion of the nitrous oxide contained in a flow of waste gas containing nitrous oxide and at least one other gaseous compound, said installation comprising:

- at least one source of a flow of waste gas containing nitrous oxide and at least one other gaseous compound,
- permeation means permitting separating by permeation at least one portion of the nitrous oxide contained in the flow of waste gas, and
- means for recovering at least one portion of the nitrous oxide separated by the permeation means.

As the case may be, the installation can comprise one or several of the following characteristics:

- the source of the flow of waste gas is an industrial unit using an industrial process discharging waste gas, preferably a unit for the production of adipic acid, a unit for the production of nitrous oxide or a unit for the production of phenol, a unit for the production of glycoxylic acid or a unit for the production of nitric acid;
- the permeation means comprise one or several membrane modules.

BRIEF DESCRIPTION OF THE DRAWINGS

The invention will now be described in greater detail with the aid of examples and with reference to the accompanying figures given by way of non-limiting illustration.

DETAILED DESCRIPTION OF THE PREFERRED EMBODIMENTS

Figure 1:
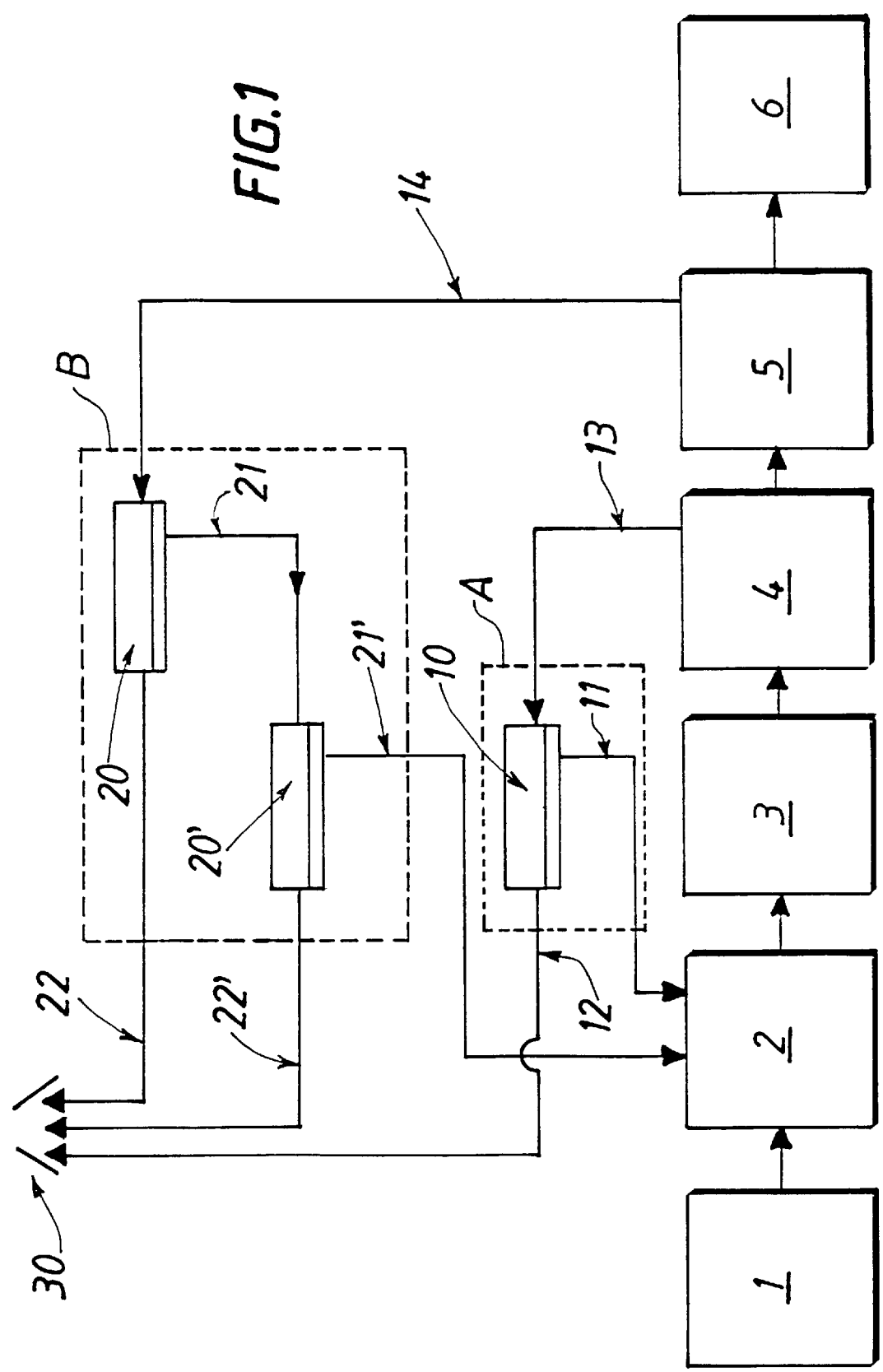
FIG. 1 shows the diagram of a unit for the production of nitrous oxide ($N_2O$) using the process for recovery and/or purification of the gaseous nitrous oxide contained in the waste gas or off gas from said production unit and conventionally discharged to the atmosphere.

With reference to FIG. 1, nitrous oxide ($N_2O$) is produced conventionally in a production unit 1 for nitrous oxide, then stored in a first unit or storage site 2 in gaseous phase, for example.

Conventionally, the production of nitrous oxide in the production unit 1 can be carried out so as to obtain a production flow of the order of 300 $Nm^3/h$ and a purity of the nitrous oxide thus produced of the order of 99%, the impurities being principally oxygen and nitrogen.

The gaseous nitrous oxide from the first storage site 2 is then liquified in a liquefaction unit 3 before being sent to a second unit or storage site 4 and/or toward a third unit or storage site 5, before being sent to a filling unit 6, for example one in which the $N_2O$ is filled into pressurized receptacles, such as gas bottles, more easily transportable.

Within the second unit or storage site 4, the nitrous oxide is stored at ambient temperature, for example at 20° C., and at high pressure, for example at $60.10^5$ Pa, whilst in the third unit or storage site 5, the nitrous oxide is stored at a lower temperature, for example at least −20° C., and at a pressure that is also lower, for example $20.10^5$ Pa.

Moreover, in these two units or storage sites 4 and 5, the nitrous oxide is under two different conditions, namely in gaseous condition and in liquid condition, the gaseous phase being in equilibrium with the liquid phase.

Within the second and third storage units 4 and 5, the purity of the nitrous oxide constituting the liquid phase is approximately 99%.

By contrast, the purity of the gaseous phase thus stored is lower than that of the liquid phase, which is to say that it contains more impurities, particularly of the type of nitrogen, oxygen and hydrogen.

An analysis of the composition of the gaseous phase of the nitrous oxide stored in the storage units 4 and 5 have given the results set forth in the following Table I.

TABLE I

| GASEOUS COMPOUND | $N_2O$ | $N_2$ | $O_2$ | $H_2$ |
|---|---|---|---|---|
| Unit 4 for storage at $60.10^5$ Pa | 96% | 2.7% | 0.3% | <0.1% |
| Unit 5 for storage at $20.10^5$ Pa | 85% | 13% | 2% | <0.1% |

The percentages (%) are volume percentages (% by Vol.).

It is customary periodically or continuously to degas the storage sites 4 and 5, which is to say that a portion of the gaseous phase contained in storages 4 and 5 is discharged to the atmosphere so as to avoid increase of the pressure within the storage units or chambers.

Moreover, such a degassing permits eliminating a portion of the mentioned impurities contained principally in the gaseous phase.

However, such degassing involves an untimely discharge to the atmosphere of a portion of the nitrous oxide ($N_2O$) contained in the gaseous phase within the storage units 4 and 5.

However, as will be seen in FIG. 1, it is possible to minimize the quantities of $N_2O$ discharged to the atmosphere by practicing a recovery, a purification and a recycling of said $N_2O$ contained in the waste gases, which is to say the degassing or off gases.

More precisely, according to the invention, the off gases discharged from the second storage unit 4 are recovered at 13, then sent to a first permeation zone A, which permeation zone A comprises a membrane module 10 having preferential selectivity for nitrous oxide, so as to be able to recover at the permeate outlet 11 of said membrane module 10 a gas enriched in nitrous oxide, for example a gas containing at least 99% of nitrous oxide, which gas can then be returned to the first storage site 2.

In the embodiment of FIG. 1, the nitrous oxide from the storage unit 4, recovered at 13, is at a pressure higher than that of the storage site 2 into which it is returned after concentration by permeation. Thereafter, no recompression is necessary to move the nitrous oxide from the site 4 to the site 2, via the membrane module 10.

It will be easily understood that this arrangement is particularly advantageous in terms particularly of equipment.

Moreover, at the retentate outlet 12 of the membrane module 10 there is recovered a gas impoverished in nitrous oxide and containing impurities, nitrogen, oxygen and/or hydrogen, which gas impoverished in $N_2O$ can be discharged at 30 to the atmosphere.

Similarly, the waste gases from the third storage site 5 are recovered at 14, then sent to a second permeation zone B, which comprises two membrane modules 20 and 20' arranged in cascade, which is to say that the permeate outlet 21 of the first module 20 feeds the second module 20' with gas to be separated.

High purity nitrous oxide, for example of the order of 99%, is recovered at the permeate outlet 21' of the second permeation module 20' and is then returned to the first storage site 2.

Moreover, the gaseous mixtures impoverished in nitrous oxide recovered at the retentate outlet 22 and 22' of the permeation modules 20 and 20' are discharged at 30 to the atmosphere.

From FIG. 1, it will be easily understood that the process of the invention permits efficient recycling of the nitrous oxide contained in the purge gases or waste gases of the storage sites 4 and 5 for nitrous oxide, which is to say giving economic value to the waste gases which until now were discharged to the atmosphere, giving rise at the same time to a pollution of the environment.

The membranes used to separate the nitrous oxide from the other compounds are conventional membranes, which is to say that those skilled in the art are able to select such membranes knowing that they are to select membranes having a preferential selectivity for the nitrous oxide relative to the other compounds, particularly nitrogen and/or oxygen.

Figure 2:
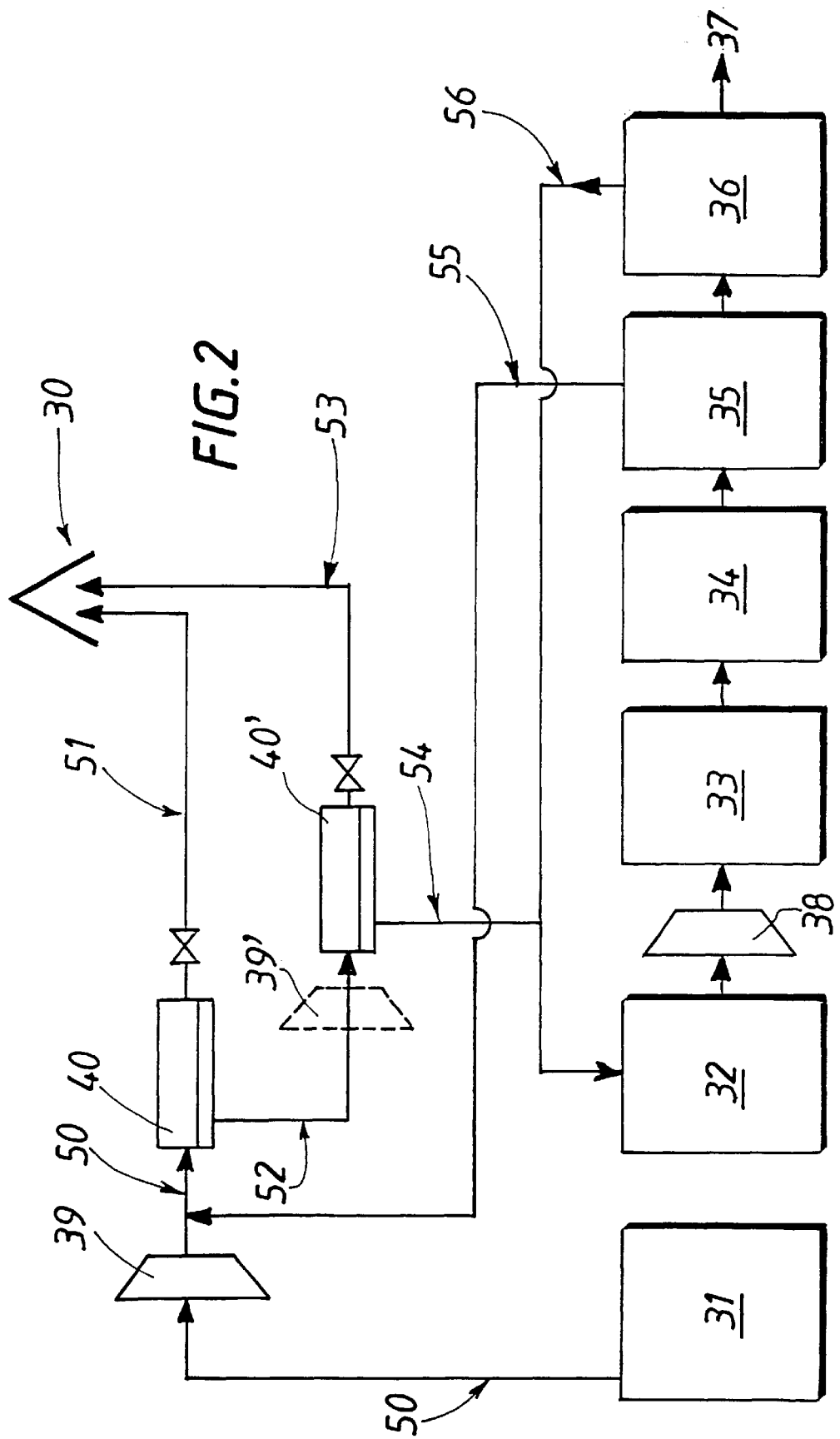
FIG. 2 shows, in a manner analogous to FIG. 1, an industrial installation for the production of adipic acid, incorporating the process for nitrous oxide recovery according to the present invention, so as to be able to recover and recycle the major portion of the nitrous oxide that is found in the waste gases from processes for the production of adipic acid.

With reference to FIG. 2, adipic acid is produced in a production unit 31 for adipic acid, discharging waste gases rich in nitrous oxide ($N_2O$) and containing moreover other gaseous compounds, in particular carbon monoxide (CO).

The waste gas thus regenerated is recovered at 50, compressed at 39 before being sent to a permeation zone comprising two permeation modules 40 and 40' arranged in cascade.

The waste gases rich in nitrous oxide are subjected to a first separation in the first membrane module 40, so as to recover, on the permeate side 52, a gas enriched in nitrous oxide, which is if desired compressed at 39', before being subjected to a new concentration by permeation in the second membrane module 40'.

The gaseous mixture poor in nitrous oxide, recovered at the retentate outlet of the first membrane module 40 and at the retentate outlet of the second membrane module 40', is recovered at 51 and 53 respectively, before being discharged to the atmosphere at 30.

The gas recovered at the permeate outlet 54 of the second membrane module 40' is recovered, then sent to a storage site 32 in gaseous phase, given that the gaseous mixture thus recovered (in 54) is constituted of nitrous oxide of high purity, which is to say of a purity greater than about 99.9%, the impurities being essentially carbon monoxide.

Then, so as to permit its reuse, the gaseous nitrous oxide subjected successively to compression at 38, for example to a pressure of $60.10^5$ Pa, a liquefaction at 33 if desired, a new storage at 34, for example in liquid phase at a pressure of about $60.10^5$ Pa, and a temperature of the order of 20° C., a further purification, for example by cryogenic distillation at 35, so as to eliminate the major portion of the residual carbon monoxide (CO), if desired a new storage 36 at low temperature, for example at −20° C. and at a pressure of the order of $20.10^5$ Pa, before being sent to a user site 37.

Moreover, it is also possible to recover the waste gases rich in nitrous oxtde discharged during the purification at 35 by distillation and/or the degassing gases from the chambers or analogous storage means at 36, to be able to recycle it.

Thus, the waste gas produced by the purification unit 35 is recovered and sent at 55 to the membrane module 40 so as there to be purified by permeation, as explained above.

Moreover, the waste gases from degassing of the storage 36 are, themselves, recovered and sent at 56 to a gaseous nitrous oxide storage 32 before being subjected to a new cycle of compression at 38, liquefaction at 33 and purification at 35.

The repeated treatment of the waste gases from the process for the production of adipic acid at 31 is carried out by a method according to the present invention and permits considerably decreasing the quantity of nitrous oxide discharged to the atmosphere, thanks to a selective recovery and retreatment of these waste gases by permeation.

In other words, the process according to the present invention permits, on the one hand, producing and making economically valuable the major portion of the nitrous oxide contained in waste gases from the unit 31 for the production of adipic acid and, on the other hand, decreasing the discharges of nitrous oxide which promote the greenhouse effect and the destruction of the ozone layer.

EXAMPLE

So as to show the effectiveness of the process for the recovery and/or purification of nitrous oxide according to the present invention, a series of tests (A to C) was carried out with waste gases whose composition is given in the following Table II, at different permeation pressures and temperatures.

These waste gases were separated by permeation by means of one or several permeation modules.

The product gas rich in nitrous oxide is recovered at the permeate outlet and and analyzed.

Moreover, the production yield at the permeate outlet has also been determined.

It will be seen from Table II that the process according to the invention permits recovering the major portion of the nitrous oxide contained in a waste gas, so as to be able to render economically valuable has nitrous oxide, which is to say to recycle it, instead of discharging it to the atmosphere.

However, it is to be stated that the process of the present invention is not limited to the recovery of waste gases from a production unit for nitrous oxide or for a unit for producing adipic acid, but can be applied to any process whose use gives rise to waste gases or off gases rich in nitrous oxide.

TABLE II

| | WASTE GAS BEFORE PERMEATION (AT THE RETENTATE INLET) | | | | | COMPOSITION OF THE RECOVERED GAS (AT THE PERMEATE OUTLET) | | | | PRODUCTION | |
|---|---|---|---|---|---|---|---|---|---|---|---|
| TEST No. | $N_2O$ (% vol) | $N_2$ (% vol) | $O_2$ (% vol) | Pressure ($10^5$ Pa) | Temperature (° C.) | $N_2O$ (% vol) | $N_2$ (% vol) | $O_2$ (% vol) | Pressure ($10^5$ Pa) | YIELD AT THE PERMEATE (IN %) | NUMBER OF PERMEATION MODULES |
| A | 96 | 2.7 | 0.3 | 13 | 30 | 99 | 0.9 | 0.2 | 2 | >90 | 1 |
| B | 85 | 13 | 2 | 20 | 10 | 98 | 0.5 | 1.5 | 2 | >60 | 1 |
| C | 85 | 13 | 2 | 20 | 40 | 99 | 0.3 | 0.6 | 1.5 | >55 | 2 |

What is claimed is:
1. Process for the recovery and/or purification of at least one portion of nitrous oxide ($N_2O$) contained in a flow of waste gas comprising nitrous oxide and at least one other gaseous component, comprising the steps of:
 (a) separating by permeation at least one portion of the nitrous oxide contained in the flow of waste gas, the flow of waste gas containing from 20 to 99.9% by volume of nitrous oxide, the flow of waste gas being a waste gas from an industrial process selected from the group consisting of a waste gas emanating from a process for the production of adipic acid, a waste gas emanating from a process for the production of nitrous oxide, a waste gas emanating from a process for the production of nitric acid, a waste gas emanating from a process for the production of glycoxylic acid and a waste gas emanating from a process for the production of phenol; and
 (b) recovering at least one portion of the nitrous oxide separated in step (a).
2. Process according to claim 1, wherein the flow of waste gas contains from 50 to 99.9% by volume of nitrous oxide.
3. Process according to claim 1, wherein the at least one other gaseous component is selected from the group consisting of nitrogen, oxygen and carbon monoxide.
4. Process according to claim 1, wherein step (a) comprises passing the flow of waste gas through at least one permeation module.
5. Process according to claim 1, wherein in step (b), a gas containing 80 to 100% of nitrous oxide is recovered.

6. Process according to claim 1, wherein the waste gas is at a temperature between −30° C. and +80° C.

7. Process according to claim 1, wherein the waste gas is at a pressure of $10^5$ Pa to $10^7$ Pa.

8. Process according to claim 4, wherein the at least one permeation module comprises membrane fibers.

9. Process according to claim 5, wherein in step (b), a gas containing at least 90% of nitrous oxide is recovered.

10. Process according to claim 6, wherein the waste gas is at a temperature between −20° C. and +60° C.

11. Process according to claim 7, wherein the waste gas is at a pressure of $10^6$ Pa to $6.10^6$ Pa.

12. Industrial installation for the recovery and/or purification of at least one portion of nitrous oxide ($N_2O$) contained in a flow of waste gas comprising nitrous oxide and at least one other gaseous compound, comprising:

at least one source of a flow of waste gas containing nitrous oxide and at least one other gaseous compound, the source of the flow of waste gas comprising an industrial unit using an industrial process discharging the waste gas, the industrial unit using an industrial process discharging the waste gas being selected from the group consisting of a unit for the production of adipic acid, a unit for the production of nitrous oxide, a unit for the production of phenol, a unit for the production of glycoxylic acid and a unit for the production of nitric acid, permeation means permitting separating by permeation at least one nitrous oxide portion contained in the flow of waste gas, and means for recovering at least one portion of the nitrous oxide separated by the permeation means.

* * * * *